US009201517B2

(12) United States Patent
Liu et al.

(10) Patent No.: US 9,201,517 B2
(45) Date of Patent: Dec. 1, 2015

(54) WIRELESS MOUSE AND WIRELESS INPUT DEVICE

(71) Applicants: LITE-ON ELECTRONICS (GUANGZHOU) LIMITED, Guangzhou (CN); LITE-ON TECHNOLOGY CORP., Taipei (TW)

(72) Inventors: Lin Liu, Taipei (TW); Chien-Hsin Lee, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 123 days.

(21) Appl. No.: 13/628,308

(22) Filed: Sep. 27, 2012

(65) Prior Publication Data

US 2013/0120263 A1    May 16, 2013

(30) Foreign Application Priority Data

Nov. 11, 2011   (CN) .................. 2011 2 0456680 U

(51) Int. Cl.
| | |
|---|---|
| *G06F 3/033* | (2013.01) |
| *G09G 5/08* | (2006.01) |
| *G06F 3/0354* | (2013.01) |
| *G06F 3/03* | (2006.01) |

(52) U.S. Cl.
CPC .............. *G06F 3/03543* (2013.01); *G06F 3/03* (2013.01); *G06F 3/033* (2013.01); *G06F 2203/0384* (2013.01)

(58) Field of Classification Search
None
See application file for complete search history.

(56) References Cited

U.S. PATENT DOCUMENTS

| | | | | |
|---|---|---|---|---|
| 8,059,093 | B2 * | 11/2011 | Chiang et al. .................. | 345/163 |
| 2005/0012719 | A1 * | 1/2005 | Su ................................... | 345/163 |
| 2005/0146504 | A1 * | 7/2005 | Huang et al. ................... | 345/163 |
| 2006/0038779 | A1 * | 2/2006 | Li ................................... | 345/163 |
| 2006/0038786 | A1 * | 2/2006 | Adan et al. ..................... | 345/163 |
| 2006/0044270 | A1 * | 3/2006 | Chen ............................... | 345/163 |
| 2008/0170034 | A1 * | 7/2008 | Lin et al. ........................ | 345/158 |
| 2009/0174659 | A1 * | 7/2009 | Chiang et al. .................. | 345/163 |
| 2009/0225029 | A1 * | 9/2009 | Wu ................................. | 345/163 |
| 2011/0115708 | A1 * | 5/2011 | Lee ................................. | 345/163 |

FOREIGN PATENT DOCUMENTS

TW            274589 M       9/2005

* cited by examiner

*Primary Examiner* — Srilakshmi K Kumar
*Assistant Examiner* — Stephen T Reed
(74) *Attorney, Agent, or Firm* — Rosenberg, Klein & Lee

(57) ABSTRACT

A wireless mouse includes a base having a top surface defining a button region and a non-button region, and a top cover including a cover body that separably covers the top surface of the base. The cover body has an inner surface facing the non-button region of the top surface and an integrally formed groove defining member extending from the inner surface into a space disposed between the cover body and the top surface of the base. The groove defining member cooperates with the inner surface of the cover body to define a positioning groove that is open to the space between the cover body and the top surface of the base into which a wireless receiver is received and releasably retained.

6 Claims, 7 Drawing Sheets

WIRELESS MOUSE AND WIRELESS INPUT DEVICE

CROSS-REFERENCE TO RELATED APPLICATION

This application claims priority to Chinese Application No. 201120456680.X, filed on Nov. 11, 2011.

BACKGROUND OF THE INVENTION

1. Field of the Invention

The invention relates to a wireless mouse, and more particularly to a wireless mouse capable of receiving a wireless receiver therein.

2. Description of the Related Art

Wireless mice have become popular input devices for electronic apparatuses. When a wireless mouse is in use, it communicates with the electronic apparatus through a wireless receiver inserted into the electronic apparatus. When the wireless mouse is not in use, the wireless receiver is removed from the electronic apparatus.

For facilitating a user to store the wireless receiver, the wireless mouse typically has a storage structure disposed therein. There are two common types of storage structures which are described in the following.

The first type allows a user to directly insert a wireless receiver into the wireless mouse. For example, as shown in FIG. 1, a wireless mouse 1 disclosed in U.S. Pat. No. 6,909, 421 has an open chamber 11 formed in a shell 10 thereof, and a receptacle 12 is provided inside the open chamber 11, such that the wireless receiver 13 can be inserted thereinto through the open chamber 11. However, dust may accumulate in the receptacle 12 because of the exposed open chamber 11 in the shell 10.

The other type allows the user to pivot upwardly and open the shell and store the wireless receiver into the wireless mouse. For example, as shown in FIG. 2, a wireless mouse disclosed in Taiwanese utility model No. M274589 has a receptacle 15 pivoted to an inner surface of a top shell 14. By adjusting the angular position of the receptacle 15 to direct an opening 151 thereof towards the outside, the wireless receiver 16 can be inserted into the receptacle 15. Then, by adjusting and rotating the receptacle 15 again to a position close to the inner surface of the top shell 14, the top shell 14 can be covered thereon. However, the structure and the manufacturing process of the wireless mouse are more complicated due to the pivoted receptacle 15, and the pivotal construction of the receptacle 15 may break easily through repeated use, thereby reducing the service life of the wireless mouse.

SUMMARY OF THE INVENTION

Therefore, an object of the present invention is to resolve the issue of a complicated structure of a conventional wireless mouse capable of receiving a wireless receiver.

Another object of the present invention is to provide a wireless mouse and a wireless input device that have a different storage structure for receiving a wireless receiver compared to the prior art.

According to the present invention, a wireless mouse is adapted for use with a wireless receiver and comprises:

a base having a top surface, the top surface defining a button region and a non-button region; and a top cover including a cover body and a groove defining member, the cover body separably covering the top surface of the base, and having a pressing portion corresponding to the button region, and a non-pressing portion corresponding to the non-button region, the non-pressing portion having an inner surface facing the non-button region of the top surface, said groove defining member being integrally formed on said non-pressing inner surface of said non-pressing portion, being disposed between said cover body and said top surface of said base, and cooperating with said cover body to define a positioning groove adapted to position the wireless receiver on the top cover.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
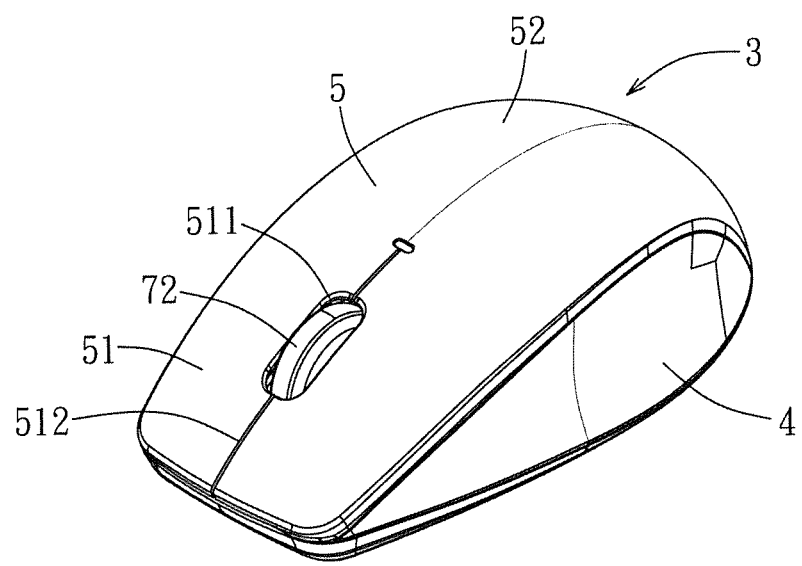
FIG. 3 is a perspective view showing an embodiment of the wireless mouse according to the present invention.
Figure 4:
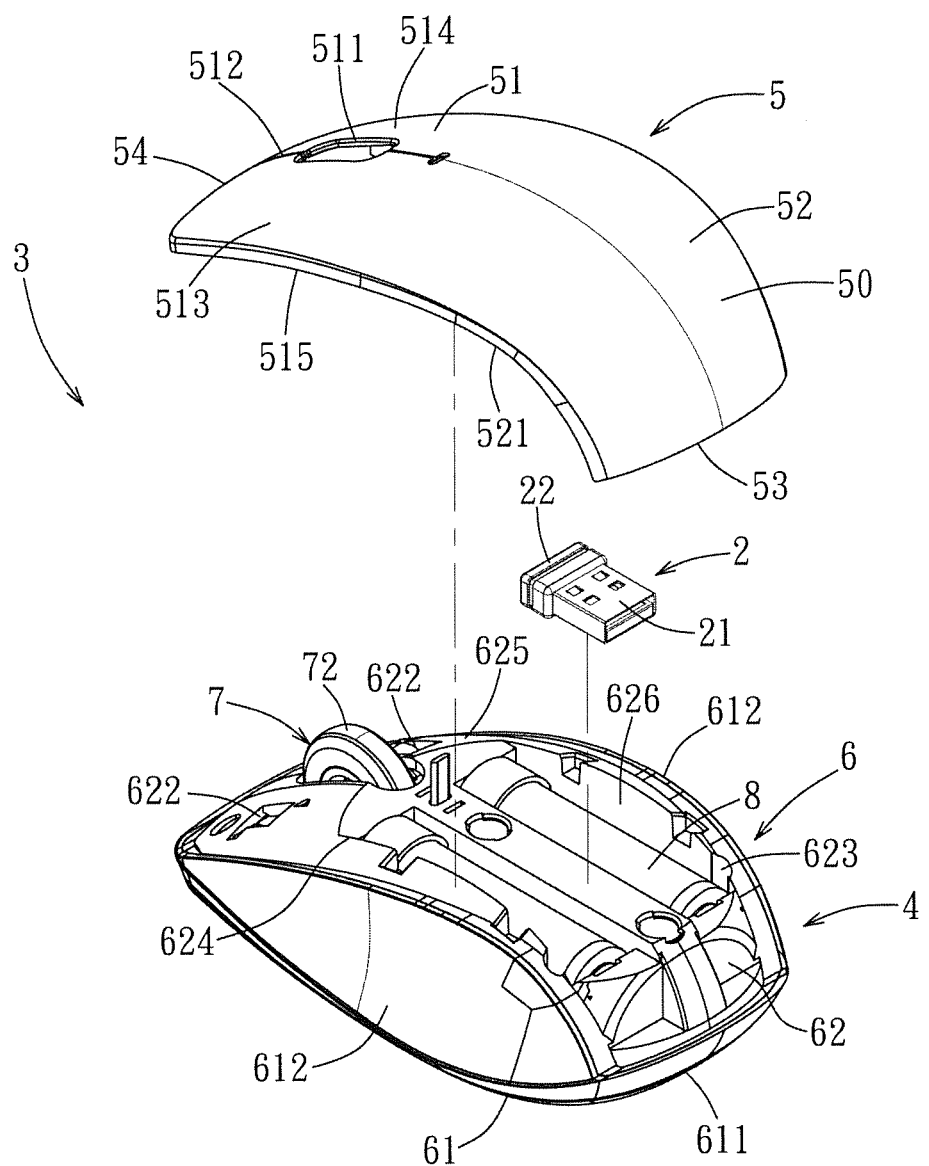
FIG. 4 is an exploded perspective view of a cover body and a base shown in FIG. 3.

Referring to FIG. 3 and FIG. 4, an embodiment of the wireless mouse 3 according to this invention is capable of receiving a wireless receiver 2. The wireless receiver 2 conforms to a USB Nano Dongle standard, and has a flat rectangular inserting portion 21 and a larger size flat rectangular holding portion 22. In this embodiment, the wireless mouse 3 comprises a base 4 and a top cover 5.

Figure 5:
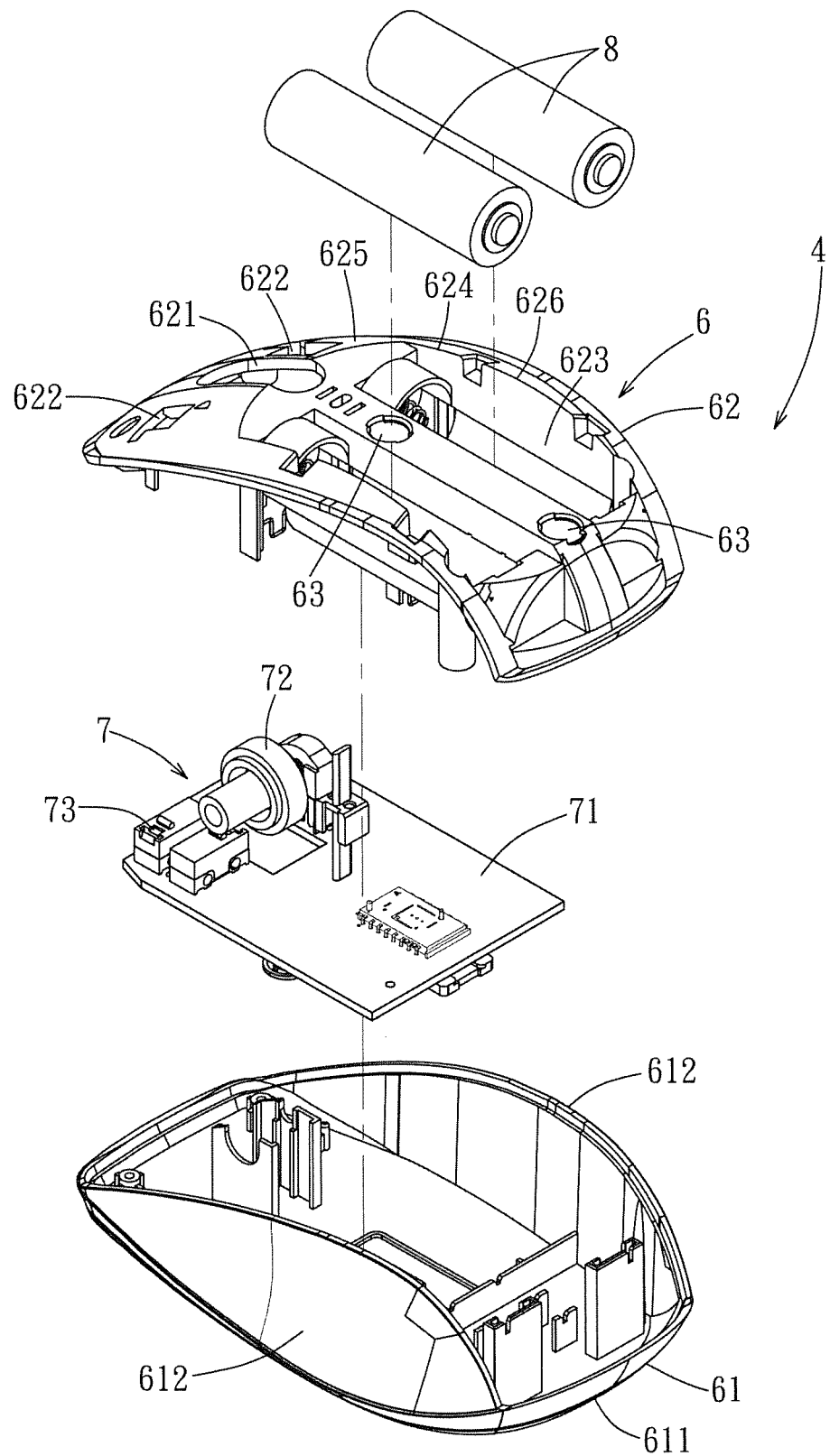
FIG. 5 is an exploded perspective view of the base shown in FIG. 4.

Referring to FIG. 5, the base 4 includes a shell 6 and a sensing module 7. The sensing module 7 includes a circuit board 71, a scroll wheel 72 disposed at a front side of the circuit board 71, and two microswitches 73 respectively disposed on the circuit board 71 and at two sides of the scroll wheel 72.

The shell 6 is used for receiving the sensing module 7. The shell 6 includes a bottom shell 61 and a top shell 62. The bottom shell 61 has a bottom wall 611 and two side walls 612 respectively extending upwardly from left and right sides of the bottom wall 611, thereby forming a receiving space. The top shell 62 is formed with a longitudinal groove opening 621 for exposing the scroll wheel 72, and two openings 622 for exposing the two microswitches 73. The remaining portion of the top shell 62 is concaved to form two longitudinally extending battery-receiving slots 623 therein for receiving batteries 8.

During assembling, the sensing module 7 is disposed on the bottom wall 611 of the bottom shell 61, the top shell 62 is covered on the bottom shell 61, and the sensing module 7 is received between the top shell 62 and the bottom shell 61. The scroll 72 and the two microswitches 73 are exposed respectively from the longitudinal groove opening 621 and the openings 622.

As shown in FIG. 4, the top shell 62 has a top surface 624 defining a button region 625 that includes the longitudinal groove opening 621 and the two openings 622, and a non-button region 626 that includes the battery-receiving slots 623.

Figure 6:
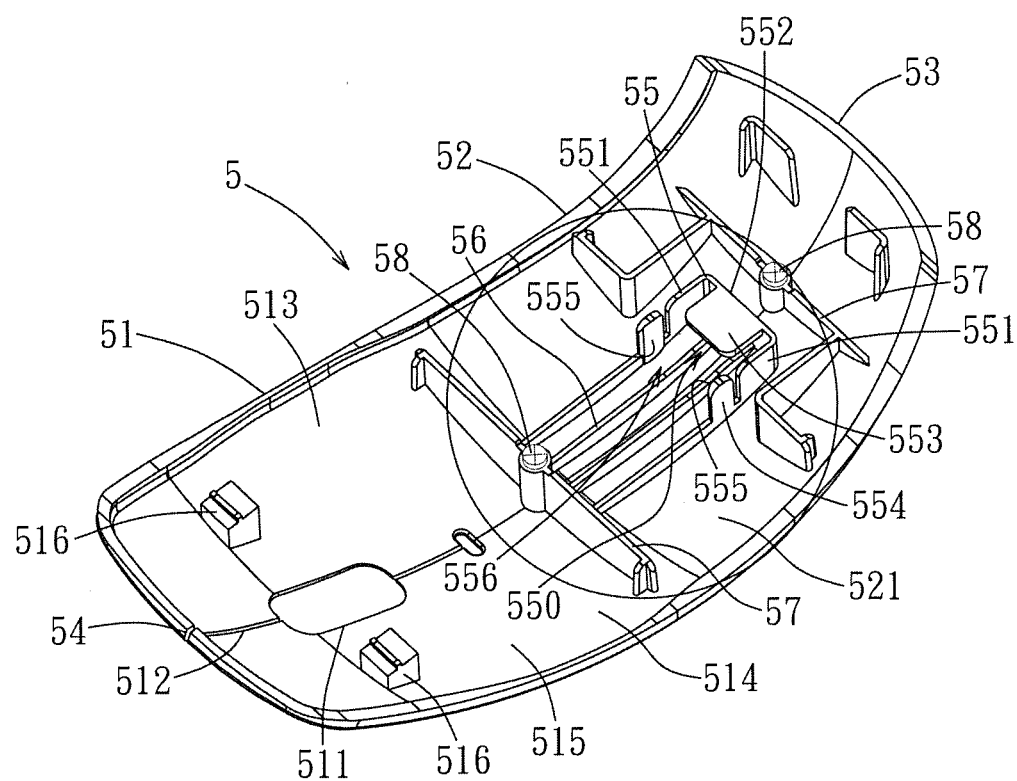
FIG. 6 is a bottom perspective view of the cover body shown in FIG. 4.
Figure 7:
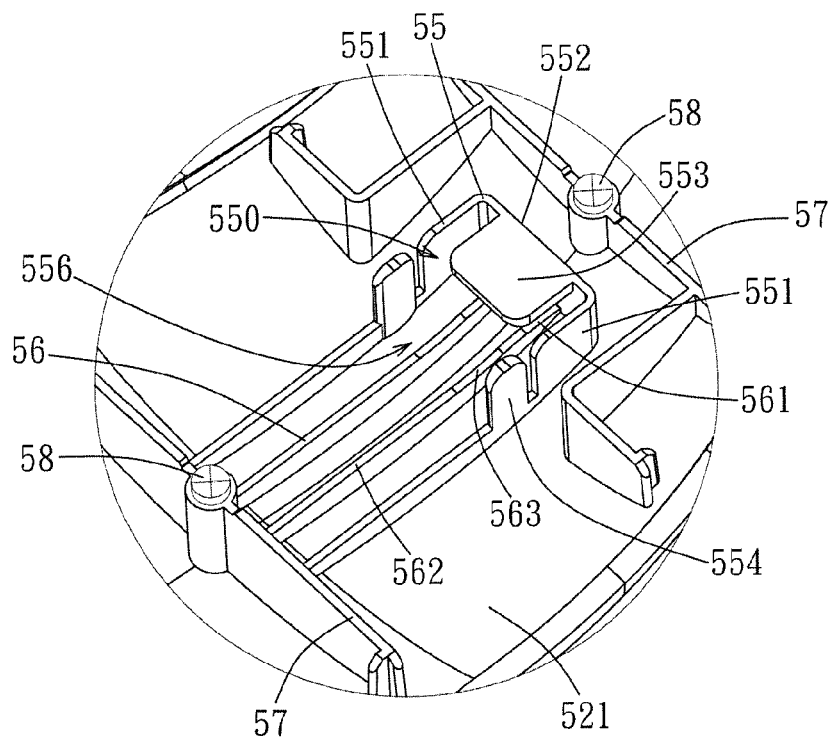
FIG. 7 is an enlarged view of an encircled portion in FIG. 6.
Figure 8:
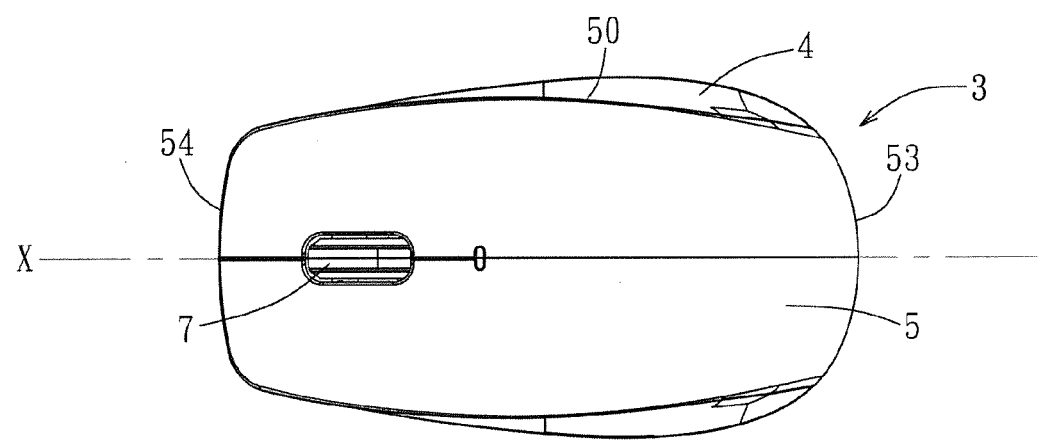
FIG. 8 is a top view of the wireless mouse shown in FIG. 3.

Referring to FIG. 4, FIG. 6, and FIG. 8, the top cover 5 is integrally made using injection molding, and separably covers the top surface 624 of the top shell 62 of the shell 6. The top cover 5 includes a cover body 50 and a groove defining member 55. To be ergonomic, the cover body 50 in this embodiment is an arc-shaped plate. The cover body 50 has a pressing portion 51 corresponding to the button region 625, and a non-pressing portion 52 corresponding to the non-button region 626. The pressing portion 51 has a pressing inner surface 515 facing the button region 625 of the top surface 624. The non-pressing portion 52 has a non-pressing inner surface 521 facing the non-button region 626 of the top surface 624, and a central line (X) extending through a central point of a back end edge 53 of the cover body 50 and a central point of a front end edge 54 of the cover body 50, as shown in FIG. 8. The groove defining member 55 is integrally formed on the non-pressing inner surface 521 of the non-pressing portion 52, and is disposed between the cover body 50 and the top surface 624 of the base 4. The groove defining member 55 cooperates with the cover body 50 to define a positioning groove 550 adapted to position the wireless receiver 2 on the top cover 5.

Along the central line (X), the pressing portion 51 has a longitudinal cover groove opening 511 formed therein for exposing the scroll wheel 72, and a slit 512 extending from a portion proximate to the non-pressing portion 52 to the front end edge 54 of the cover body 50, so that the pressing portion 51 is divided into a left button 513 and a right button 514, both being movable up and down. The pressing inner surface 515 of the pressing portion 51 has two pressing components 516 respectively extending from portions that correspond to the left and right buttons 513, 514, and that are respectively corresponding to the openings 622. When the top cover 5 covers the shell 6 and a user presses the left button 513 or the right button 514, the corresponding pressing component 516 presses against the corresponding microswitch 73 through the corresponding opening 622.

Figure 9:
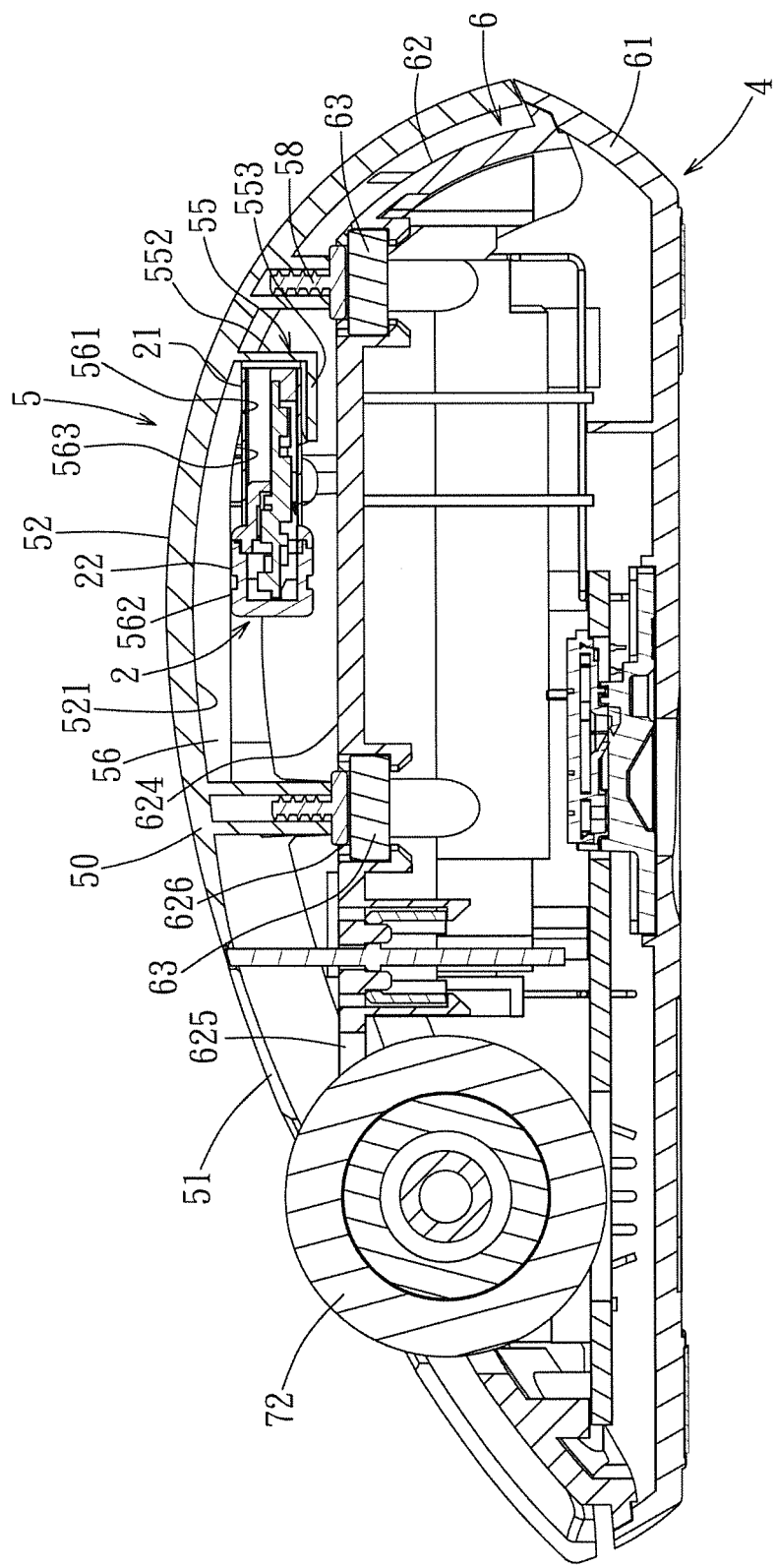
FIG. 9 is a sectional view of the wireless mouse shown in FIG. 8 taken along a central line (X).

Referring to FIG. 9, due to the arc-shaped design of the cover body 50, when the non-pressing inner surface 521 of the non-pressing portion 52 covers the base 4, the non-pressing inner surface 521 is opposite to and spaced apart from the top surface 624 of the top shell 62, thereby defining an accommodating space for forming the positioning groove 550 (see FIG. 6) therein for receiving the wireless receiver 2.

Referring to FIG. 6 to FIG. 9, the positioning groove 550 is formed at a central position of the non-pressing inner surface 521 of the non-pressing portion 52 and is proximate to the back end edge 53. The positioning groove 550 has a groove opening directed towards the front end edge 54 of the cover body 50. In detail, the groove defining member 55 has: two opposite first vertical walls 551 protruding from the non-pressing inner surface 521, extending along a direction parallel to the central line (X), and being spaced apart from each other; a second vertical wall 552 protruding from the non-pressing inner surface 521, and interconnecting rear edges of the two first vertical walls 551; and a stopping plate 553 extending perpendicularly from a free end of the second vertical wall 552 and spaced apart from the non-pressing inner surface 521. The distance between the two first vertical walls 551 corresponds to the width of the inserting portion 21 of the wireless receiver 2, such that the inserting portion 21 of the wireless receiver 2 is effectively positioned when inserted into the positioning groove 550.

Moreover, the groove defining member 55 further has two third vertical walls 554 protruding from the non-pressing inner surface 521 and being respectively adjacent to and spaced apart from front edges of the two first vertical walls 551. Each third vertical wall 554 has an inner wall surface 555. The inner wall surfaces 555 of the two third vertical walls 554 face each other, and are curved convex surfaces. The inner wall surfaces 555 of the two third vertical walls 554 cooperate with each other to form a guiding groove 556 therebetween, thereby enhancing the clamping force applied by the groove defining member 55 in a left-to-right direction. The two third vertical walls 554 are usable for smoothly guiding the wireless receiver 2 into the positioning groove 550.

It should be noted that the opening direction and location of the positioning groove 550 can be adjusted according to the design requirement, and the only limitation is that the positioning groove 550 is disposed in the non-pressing inner surface 521 of the non-pressing portion 52.

Furthermore, because the non-pressing inner surface 521 is arc-shaped, it is possible to have a support portion protruding there from between the first vertical walls 551 and between the third vertical walls 554 for the wireless receiver 2 to lean on. In this embodiment, the support portion includes a plurality of ribs 56 protruding between the first vertical walls 551, spaced apart from each other, and extending from the second vertical wall 552 along a direction parallel to the central line (X). Each rib 56 has a first bottom edge 561, a second bottom edge 562, and a third bottom edge 563 interconnecting the first and second bottom edges 561 and 562. The first bottom edge 561 extends into the positioning groove 550, is disposed between the first vertical walls 551 and between the third vertical walls 554, and is spaced apart from and corresponding to the stopping plate 553. The vertical distance between the first bottom edges 561 of the ribs 56 and the stopping plate 553 fits the thickness of the inserting portion 21 of the wireless receiver 2, such that the inserting portion 21 of the wireless receiver 2 is clamped between the stopping plate 553 and the first bottom edges 561 of the ribs 56 when received in the positioning groove 550, so as to maintain effectively relative positions thereamong. The third bottom edge 563 is disposed outwardly of the positioning groove 550.

Since the thickness of the holding portion 22 is greater than that of the inserting portion 21, when the top cover 5 covers the base 4, the second bottom edges 562 are above the first bottom edges 561. When the wireless receiver 2 is inserted into the positioning groove 550, the holding portion 22 is exposed outside from the positioning groove 550 and abuts against the second bottom edges 562. Each third bottom edge 563 is configured as a slope for interconnecting the first and second bottom edges 561 and 562.

Figure 1:
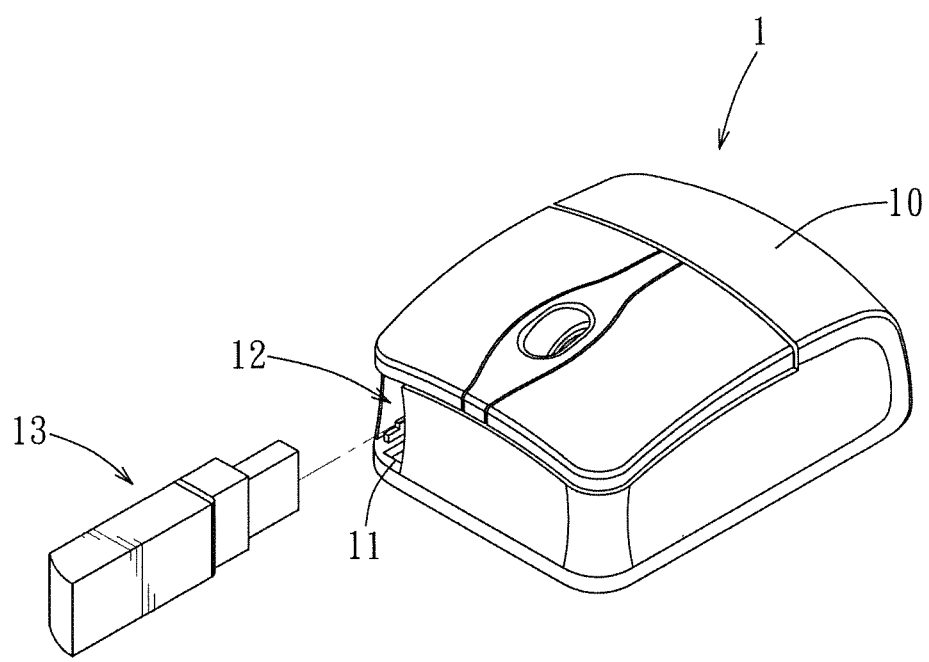
FIG. 1 is a perspective view of a conventional wireless mouse.
Figure 2:
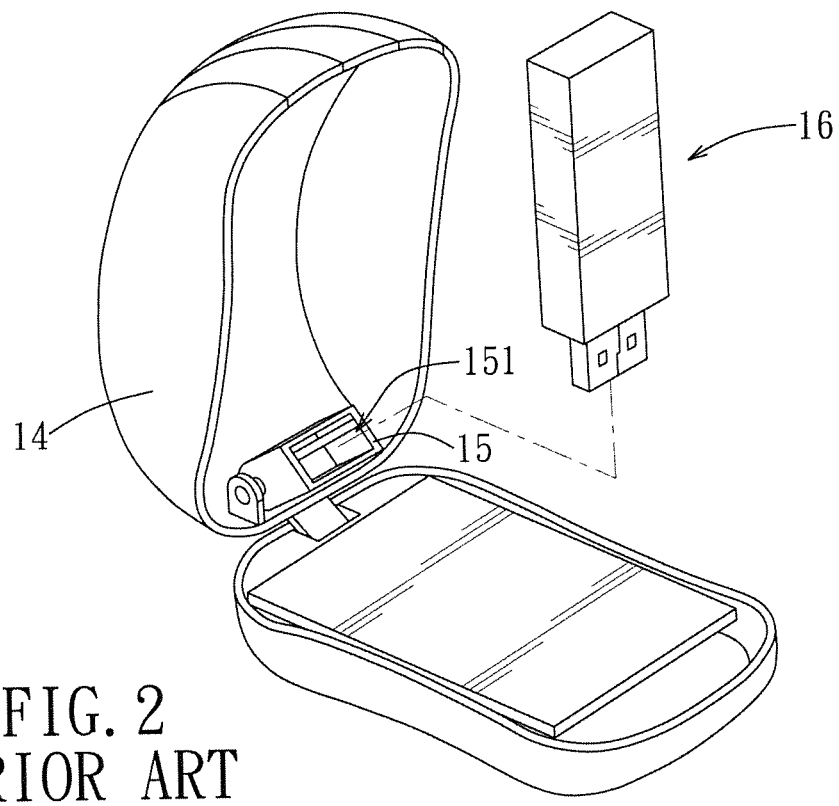
FIG. 2 is a perspective view of another conventional wireless mouse.

When the wireless receiver 2 is not in use, the top cover 5 of the wireless mouse 3 may be taken off from the base 4 for inserting the wireless receiver 2 into the positioning groove 550, followed by covering the top cover 5 on the base 4 to complete a receiver-storing process. The third bottom edges 563 are also helpful for guiding insertion of the wireless receiver 2 into the positioning groove 550. Because the positioning groove 550 of this embodiment is directly formed in the top cover 5, the pivoting movement of the receptacle 15 relative to the top cover 14 as shown in FIG. 2 is no longer needed, thereby resolving the product life reduction issue arising from repeated storage actions. The groove defining member 55 is integrally made with the cover body 50 to form the positioning groove 550, thereby simplifying the production process and saving assembly costs.

In order to enhance structural strength of the top cover 5, the non-pressing inner surface 521 of the cover body 50 further has a plurality of transversely extending ribs 57 protruding therefrom. The height of the extending ribs 57 substantially equals the vertical distance between the non-pressing inner surface 521 of the cover body 50 and the top surface 624 of the top shell 62. When the top cover 5 covers the shell 6, the extending ribs 57 abut against the non-button region 626 and cross the battery-receiving slots 623 to confine the batteries 8 within the battery-receiving slots 623. Therefore, the top cover 5 may serve as a battery cover, resulting in a simpler structure. In this embodiment, the groove defining member 55 is disposed between the extending ribs 57.

Moreover, the non-button region 626 of the top surface 624 of the top shell 62 is embedded with a plurality of magnets 63. The positions of the non-pressing inner surface 521 of the cover body 50 that correspond to the magnets 63 are embedded with a plurality of metal components 58, respectively, such that when the top cover 5 covers the top shell 62, the top cover 5 is firmly fixed on the base 4 by the magnetic attractive force between the magnets 63 and the metal components 58.

To sum up, the positioning groove 550, which is defined by the groove defining member 55 integrally formed on the non-pressing inner surface 521 of the non-pressing portion 52 of the cover body 50, uses the idle space inside the wireless mouse 3 to receive the wireless receiver 2, to simplify the production process, and to save production costs. In addition to the button function, the top cover 5 may also serve as a battery cover and receive the wireless receiver 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A wireless mouse adapted for use with a wireless receiver, said wireless mouse comprising:
a base having:
a top surface defining a button region and a non-button region, said button region being formed with a longitudinal groove opening, and two openings respectively disposed at two sides of said longitudinal groove opening; and
a sensing module including:
a circuit board,
a scroll wheel disposed on said circuit board and exposed from said longitudinal groove opening, and
two microswitches respectively exposed from said two openings of said button region; and
a top cover including a cover body separably covering said top surface of said base, and having a pressing portion corresponding to said button region and a non-pressing portion corresponding to said non-button region, said non-pressing portion having a non-pressing inner surface facing said non-button region of said top surface of said base, said non-pressing inner surface having a groove defining member integrally formed thereon and extending from said non-pressing inner surface into a space defined between said cover body and said top surface of said base, said pressing portion of said cover body having a pressing inner surface facing said top surface of said base, a longitudinal cover groove opening formed therein for exposing said scroll wheel, and two pressing components respectively extending from said pressing inner surface of said pressing portion into said openings of said button region, wherein said groove defining member cooperates with said cover body to define a positioning groove open to said space between said cover body and said top surface of said base into which the wireless receiver is removably received and releasably retained underside said cover body subsequent to separation of said cover body from said base,
wherein said cover body is an arc-shaped plate, and has a front end edge and a back end edge, said pressing portion being proximate to said front end edge, said non-pressing portion being proximate to said back end edge and distal from said front end edge,
wherein said groove defining member includes:
two opposite first vertical walls extending vertically from said non-pressing inner surface of said non-pressing portion on opposing sides of said positioning groove, a second vertical wall extending vertically from said non-pressing inner surface of said non-pressing portion and positioned transversely between said two first vertical walls in integral connection therewith, and a stopping plate extending horizontally and laterally at a free end of said second vertical wall in a spaced apart relationship with said non-pressing inner surface of said non-pressing portion to define said positioning groove as a cavity for receipt of the wireless receiver, said positioning groove being defined between said stopping plate, said first and second vertical walls, and said non-pressing inner surface of said non-pressing portion,
a plurality of ribs extending vertically from said non-pressing inner surface of said non-pressing portion of said cover body, said plurality of ribs being disposed substantially in parallel between and to said first vertical walls, and being vertically spaced apart from and disposed at least partially in correspondence with said stopping plate, thereby clamping the wireless receiver between said stopping plate and said plurality of ribs when the wireless receiver is received in said positioning groove,
wherein said positioning groove has a guiding groove disposed longitudinally along said top cover, and adjacent to and between said first vertical walls and adapted for guiding the wireless receiver into said positioning groove atop said plurality of ribs and
wherein said groove defining member further has two third vertical walls protruding from said non-pressing inner surface of said non-pressing portion each of said third vertical walls being respectively disposed adjacent to and in alignment with a respective one of said two first vertical walls to thereby define said guiding groove therebetween.

2. The wireless mouse as claimed in claim 1, wherein each of said third vertical walls has an inner wall surface facing the other of said third vertical walls, said inner wall surface of each of said two third vertical walls having an arcuate convex surface contour for an enhanced cooperation with the wireless receiver received therebetween, thus improving the groove defining number's clamping function.

3. The wireless mouse as claimed in claim 1, wherein said non-button region of said top surface is concaved to form at least one longitudinally extending battery-receiving slot therein, said non-pressing inner surface of said non-pressing portion of said cover body further having at least one transversely extending rib that protrudes therefrom, that abuts against said non-button region, and that is disposed directly above and crosses said battery-receiving slot.

4. A wireless input device comprising:
a wireless receiver;
a base having:
   a top surface defining a button region and a non-button region, said button region being formed with a longitudinal groove opening, and two openings respectively disposed at two sides of said longitudinal groove opening; and
a sensing module including:
   a circuit board,
   a scroll wheel disposed on said circuit board and exposed from said longitudinal groove opening, and
   two microswitches respectively exposed from said two openings of said button region; and
a top cover including a cover body separably covering said top surface of said base, and having a pressing portion corresponding to said button region and a non-pressing portion corresponding to said non-button region, said non-pressing portion having a non-pressing inner surface facing said non-button region of said top surface of said base, said non-pressing inner surface having a groove defining member integrally formed thereon and extending from said non-pressing inner surface into a space defined between said cover body and said top surface of said base, wherein said groove defining member cooperates with said cover body to define a positioning groove open to said space between said cover body and said top surface of said base into which said wireless receiver is removably received and releasably retained underside said cover body subsequent to separation of said cover body from said base,
wherein said pressing portion of said cover body has a pressing inner surface facing said top surface of said base, wherein a longitudinal cover groove opening is formed therein for exposing said scroll wheel, and two pressing components respectively extend from said pressing inner surface of said pressing portion into said openings of said button region,
wherein said cover body is an arc-shared plate, and has a front end edge and a back end edge, said pressing portion being proximate to said front end edge, said non-pressing portion being proximate to said front end edge, said non-pressing portion being proximate to said back end edge and distal from said front end edge,
wherein said groove defining member includes:
two opposite first vertical walls extending vertically from said non-pressing inner surface of said non-pressing portion at opposing sides of said positioning groove, a second vertical wall extending vertically from said non-pressing inner surface of said non-pressing portion and positioned transversely between said two first vertical walls in integral connection therewith, and a stopping plate extending horizontally and laterally at a free end of said second vertical wall in a spaced apart relationship with said non-pressing inner surface of said non-pressing portion to define said positioning groove as a cavity for receipt of the wireless receiver, said positioning groove being defined between said stopping plate, said first and second vertical walls, and said non-pressing inner surface of said non-pressing portion,
a plurality of ribs extending vertically from said non-pressing inner surface of said non-pressing portion of said cover body, said plurality of ribs being disposed substantially in parallel to and between said first vertical walls, and being vertically spaced apart from and disposed at least partially in correspondence with said stopping plate, thereby clamping said wireless receiver between said stopping plate and said ribs when the wireless receiver is received in said positioning groove,
wherein said positioning groove has a guiding groove disposed longitudinally along said too cover, and adjacent to and between said first vertical walls and adapted for guiding the wireless receiver into said positioning groove atop said plurality of ribs, and
wherein said groove defining member further has two third vertical walls protruding from said non-pressing inner surface of said non-pressing portion, each of said third vertical walls being respectively disposed adjacent to and aligned with a respective one of said two first vertical walls to thereby define said guiding groove therebetween.

5. The wireless input device as claimed in claim 4, wherein each of said third vertical walls has an inner wall surface facing the other of said third vertical walls, said inner wall surface of each of said two third vertical walls having an arcuate convex surface contour for an enhanced cooperation with the wireless receiver received therebetween, thus improving the groove defining number's clamping function.

6. The wireless input device as claimed in claim 4, wherein said non-button region of said top surface is concaved to form at least one longitudinally extending battery-receiving slot therein, said non-pressing inner surface of said non-pressing portion of said cover body further having at least one transversely extending rib that protrudes therefrom, that abuts against said non-button region, and that is disposed directly above and crosses said battery-receiving slot.

* * * * *